United States Patent [19]

Kenji et al.

[11] 4,291,090

[45] Sep. 22, 1981

[54] HEAT SEALABLE PLASTIC FILMS COATED WITH A COATING COMPOSITION

[76] Inventors: Fujisawa Kenji, 1-3, Honcho 1-Chome, Jyoetsu; Katsube Kazuo, 30; Yako Tadataka, 1100, both of Oaza Arai, Arai; Uemura Koich, 5-1-506, Higashi Izumigaoka 2-chome, Toyonaka; Harada Yuichi; Sakai Yasumasa, both of 238, Aza Hayashi, Tsugiya, Amagasaki, all of Japan

[21] Appl. No.: 971,117

[22] Filed: Dec. 19, 1978

Related U.S. Application Data

[60] Continuation-in-part of Ser. No. 948,006, Oct. 2, 1978, abandoned, which is a division of Ser. No. 806,579, Jun. 15, 1977, abandoned.

[30] Foreign Application Priority Data

Jun. 21, 1976 [JP] Japan .................................. 51-73498
Dec. 20, 1977 [JP] Japan ................................ 52-154122

[51] Int. Cl.$^3$ ...................... B32B 5/16; B32B 27/08; B32B 27/28
[52] U.S. Cl. ............................ 428/327; 260/29.6 TA; 428/339; 428/483; 428/516; 428/518
[58] Field of Search ................ 428/327, 339, 516, 910, 428/483, 518, 523; 260/28.5 R, 29.6 TA

[56] References Cited

U.S. PATENT DOCUMENTS

| | | | |
|---|---|---|---|
| 3,309,330 | 3/1967 | Settlage | 428/483 X |
| 3,362,841 | 1/1968 | Menikiteim | 428/516 |
| 3,394,029 | 7/1968 | MacArthur | 428/516 |
| 3,663,334 | 5/1972 | Mueller-Tamm et al. | 428/516 |
| 3,740,367 | 6/1973 | Winkelblech | 260/29.6 H |
| 3,753,769 | 8/1973 | Steiner | 428/349 |
| 4,066,820 | 1/1978 | Kelly et al. | 428/483 |
| 4,121,016 | 10/1978 | Garrison | 428/483 |

FOREIGN PATENT DOCUMENTS 295137 12/1966 Australia.
46-42240 12/1971 Japan.

OTHER PUBLICATIONS

Derwent Abstract, 78602S-A, Jap. Pat. #42240/1971, Toray Inds. Inc., 28/3/68.

*Primary Examiner*—Bruce H. Hess
*Attorney, Agent, or Firm*—Hubbell, Cohen, Stiefel & Gross

[57] ABSTRACT

Heat sealable plastic films coated with a coating composition in the form of an aqueous dispersion containing specific copolymers in particulate form and which have good heat-sealing properties.

10 Claims, No Drawings

HEAT SEALABLE PLASTIC FILMS COATED WITH A COATING COMPOSITION

CROSS-REFERENCE TO RELATED APPLICATIONS

This is a continuation-in-part of co-pending application Ser. No. 948,006, filed Oct. 2, 1978, now abandoned, which is a division of application Ser. No. 806,579, filed June 15, 1977 and now abandoned, the contents of both said applications being incorporated herein by reference.

BACKGROUND OF THE INVENTION

1. Field of the Invention

This invention relates to coating compositions for plastics and heat-sealable plastic films coated therewith. More particularly, it relates to a heat-sealable plastic film coated with a coating composition comprising an aqueous dispersion containing a specific copolymer and which possesses excellent heat-sealing characteristics.

2. The Prior Art

Plastic films such as polyester films, polyolefin films and the like have superior transparency and physical or chemical strength, but do not have superior heat-sealing or gas barrier properties. To improve such properties of plastic films it has heretofore been proposed to coat same with a solution of a thermoplastic copolymer such as vinylidene-chloride resin in various kinds of organic solvents. While such a copolymer can readily give improved adhesion to the base film, solvents to be used for dissolving the copolymer are usually very volatile and flammable thereby inducing a danger of ignition or explosion. Moreover, some of the organic solvents which may be so utilized generate toxic vapors, thereby causing other problems. In addition, a trace amount of the organic solvent used tends to remain in the coating layer since its removal in coating procedures is difficult. Such remaining organic solvent should be avoided, particularly where the coated plastic film is used as packaging for foods or the like. Accordingly, in order to eliminate the remaining solvent, it is necessary to use large scale drying apparatus which is, however, uneconomical.

On the other hand, if an aqueous dispersion of the copolymer to be coated is prepared, the above deficiencies in the properties of the resulting plastic film resulting from the presence of residual solvent and in its preparation may be solved. However, in the case of the use of a plastic film whose surface is only subjected to a corona discharge or oxidation agent treatment, it is generally difficult to achieve sufficient adhesion between the base film and the copolymer used by application of an aqueous copolymer dispersion directly on the treated film surface. Therefore, the base film is usually pre-treated with an anchor coating or sub-coat. This is also uneconomical because of the necessity for plural coating operations.

Accordingly, it has also been proposed to obtain sufficient adhesion by the direct-coating of plastic films with an aqueous polymer dispersion. Thus, for example, the use of a mixture of an aqueous alkyl acrylate dispersion and methylol melamine or methyl-etherified methylol melamine (Japanese Patent Publication No. 42,240/1971 has been suggested for this purpose). The resulting coating layer would improve adhesion to the base plastic film but would deleteriously affect the thermoplasticity or heat-sealing characteristics which are important basic properties of the plastic film.

A further attempt to improve such coated films involved copolymerizing an acrylate copolymer with an $\alpha,\beta$-unsaturated carboxylic acid such as acrylic acid, and neutralizing the resulting free carboxylic acid copolymer with a base such as ammonia to yield a water-soluble copolymer, to improve adhesion of the coating (U.S. Pat. No. 3,753,769). The resulting layer, however, is deficient in that it is generally weak in mechanical strength or tends to be subject to blocking. Therefore, such a method would not provide a coated film possessing the fundamental and essential characteristics of durability and blocking resistance. In addition, the coating composition employed in said method is deficient in that the copolymer may not be incorporated therein in a high concentration, since it is soluble in water.

SUMMARY OF THE INVENTION

After detailed studies of many coating compositions the present inventors have discovered an acrylate copolymer composition which is applied to plastic film in the form of an aqueous dispersion and which provides satisfactory adhesion and heat-sealing properties. Accordingly, the invention provides a heat-sealable plastic film coated with such a composition.

In accordance with the invention, a heat-sealable plastic film is coated with a composition which comprises an aqueous dispersion containing, in substantially particluate form a copolymer (a) at least one $\alpha,\beta$-unsaturated carboxylic acid in an amount of from 0.1 to 10% by weight of the copolymer;

(b) at least one acrylic ester selected from the group consisting of one alkyl acrylates whose alkyl group contains from one to twelve carbon atoms and alkyl methacrylates whose alkyl group contains from one to twelve carbon atoms, said ingredients being incorporated in the copolymer in proportions such that the copolymer has an average molecular weight of from 5,000 to 150,000, a second-order transition temperature of from 30° to 70° C., and comprises particles whose size is primarily from 0.01 to 1.0 micron; and said copolymer being incorporated in the aqueous dispersion in an amount of from 10 to 60 percent by weight thereof;

In a preferred embodiment, the copolymer further comprises:

(c) at least one copolymerizable vinyl monomer selected from the group consisting of hydroxyalkyl esters of $\alpha,\beta$-unsaturated carboxylic acids, epoxy-substituted esters of $\alpha,\beta$-unsaturated carboxylic acids, vinyl-substituted aromatic hydrocarbons, $\alpha,\beta$-unsaturated carbonamides, vinyl esters of aliphatic acids, and vinyl chloride, in an amount of from 0.1 to 80 percent by weight of the copolymer.

DESCRIPTION OF THE PREFERRED EMBODIMENTS

One of the main features of the composition which is coated on the plastic film of the invention resides in its form as an aqueous dispersion in which a specific copolymer is dispersed in substantially particulate form.

The coating composition of the invention is applicable, directly as a coating for film-like base materials of polyester or polyolefin plastics, without the necessity for any sub-coating; possesses excellent adhesion to the plastic base films, and can provide a coating layer possessing satisfactory heat-sealing, blocking resistance, durability, water resistance and like properties.

The other features and characteristics achieved by the invention will further be clarified by the following explanation.

The α,β-unsaturated carboxylic acid to be used for the formation of the copolymer utilized in the invention includes acrylic acid, methacrylic acid, maleic acid, itaconic acid, citraconic acid, crotonic acid, fumaric acid, maleic anhydride and the like. When an α,β-unsaturated carboxylic acid having two or more carboxyl groups is used, it may be in the form of the half ester. The quantity of the carboxylic acid used is about 0.1 to 10 percent by weight of the copolymer to be formed, the carboxylic acid imparting adhesion to the plastic base material. Were the copolymer to comprise over 10% of the carboxylic acid, it would show a high acceptability to water or base and become generally soluble in the base. Resulting coating layers also tend to exhibit lower blocking resistance and durability characteristics. On the other hand, when the copolymer comprises less than 0.1% of the acid, it generally cannot be expected to sufficiently adhere to the plastic base material.

A mixture of two or more kinds of the carboxylic acid may also be employed.

The alkyl acrylate or alkyl methacrylate ingredient comprises the $C_1$-$C_{12}$ alkyl esters of acrylic acid and methacrylic acid such as: methyl acrylate, ethyl acrylate, isopropyl acrylate, n-butyl acrylate, iso-butyl acrylate, amyl acrylate, n-hexyl acrylate, 2-ethylhexyl acrylate, lauryl acrylate, and methyl methacrylate, ethyl methacrylate, isopropyl methacrylate, n-butyl methacrylate, iso-butyl methacrylate, amyl methacrylate, n-hexyl methacrylate, 2-ethylhexyl methacrylate, lauryl methacrylate, etc.

The alkyl acrylate or alkyl methacrylate esters play a principal role in the formation of the coating and may be employed in combinations as follows:

(1) one or more kinds of alkyl acrylates
(2) one or more kinds of alkyl methacrylates
(3) one or more kinds of alkyl acrylates and one or more kinds of alkyl methacrylates.

The ratio of alkyl acrylates and/or alkyl methacrylates is adjusted so as to yield the desired second-order transition temperature, taking into consideration the particular copolymerizable vinyl monomer (c) which may also be incorporated in the copolymer.

The copolymerizable vinyl monomer component (c) is exemplified by the following, non-limiting types of materials:

(i) vinyl-substituted aromatic hydrocarbons such as styrene, α-methylstyrene or the like, (ii) α,β-unsaturated carbonamides such as acrylamide, methacrylamide, N-methoxyacrylamide or the like, (iii) hydroxyalkyl esters of α,β-unsaturated carboxylic acids such as 2-hydroxyethyl acrylate (or methacrylate), 2-hydroxypropyl acrylate (or methacrylate) or the like, (iv) esters of α,β-unsaturated carboxylic acids having an epoxy group such as glycidyl acrylate (or methacrylate) or the like, (v) vinyl esters of aliphatic acids such as vinyl acetate, vinyl propionate or the like, and (vi) vinyl chloride.

The preferred amount of the copolymerizable vinyl monomer to be added is about 0.1–80 percent by weight of the copolymer to be formed. Of course the vinyl monomer (c) may be omitted entirely.

The copolymerizable vinyl monomers may be employed alone or in admixture. The vinyl monomers modify the hardness of the resulting coating layer. Especially the vinyl monomers of types (iii) and (iv) above impart adhesion to the base material, and particularly give such adhesion when used together with the α,β-unsaturated carboxylic acid.

The polymerization using the above-mentioned monomers is conducted in an aqueous medium and can be achieved by utilizing the procedures known per se, for example, the method disclosed in Japanese Patent Publication No. 36,942/1974.

The copolymers of the invention possess an average molecular weight from approximately 5,000 to approximately 150,000 and a second-order transition temperature (Tg, glass transition temperature) from approximately 20° C. to approximately 100° C., preferably, 30°–70° C.

When a copolymer having an average molecular weight over 150,000 was used, we have found that adhesion to the plastic base material is lowered and viscous flow to attain good heat-sealing is lost. On the other hand, when the copolymer has a molecular weight of less than 5,000, the characteristics as a coating layer would be lost and sufficient heat-sealing strengths would not be obtained. The preferred average molecular weight of the copolymer is about 10,000 to 80,000. As used herein, the average molecular weight means weight-average molecular weight.

As stated above, the preferred second-order transition temperature is about 30° to 70° C. When the copolymer has a Tg below 20° C., the resulting coating layer causes blocking, because of high adhesion. On the other hand, in the case of copolymers having second-order transition temperatures in excess of 100° C. the resulting layer shows a high hardness and lowered flexibility, thereby causing loss of heat-sealing properties.

The copolymer is made in an aqueous dispersion in substantially particulate form. There is thus intended particles which, under an electron microscope, have particle sizes of from about 0.01 micron to about 1.0 micron, preferably 0.01 to 0.5 micron, and more preferably 0.01 to 0.3 micron. At least 90% of the total particles of the copolymer are preferably within the above ranges.

The aqueous medium may be one containing substantially water, to which water-soluble organic solvents such as alcohols or the like may be mixed. The greater the water content of the medium, the better. The preferred concentration of the copolymer in the aqueous medium is about 10 to 60 percent by weight, preferably about 15 to 45%.

If necessary, lubricants, anti-blocking agents, antistatic agents, plasticizers, anti-oxidizing agents, stabilizers and the like may be added to the aqueous dispersion.

The base materials to which the coating composition is applied include polyethylene films, polypropylene films, polybutene films and polyester films, which may be biaxially or monoaxially oriented, or not oriented.

The coating composition is especially effective for biaxially oriented plastic films. The contact angle of the base film surface to water is preferably less than 85°. Polyester films may be useable as such, but polyolefin films are desirably first subjected to corona discharge or oxidation agent surface treatment.

Further, the plastic base material films or sheets are not limited to the above-mentioned ones. It is preferred to use as the copolymer a material all or part of whose carboxyl groups are neutralized with a volatile base, from the viewpoint of stability of the aqueous coating composition. When a stabilizer is used, it is not required to use such a neutralized copolymer.

The coating composition may also serve as an anchor coating or sub-coating for plastic films. For example, one or both surfaces of a plastic base film may be coated with the coating composition, and one or both of the coated surfaces are thereafter further coated by an aqueous dispersion of, e.g., vinylidene chloride copolymer.

Application of the composition to plastic base materials may be carried out in accordance with conventional methods.

The invention is hereinafter illustrated by the following examples. The test methods used in the examples are as follows:

(a) Cellophane Tape Test

A pressure-sensitive adhesive cellophane tape, 24 mm×200 mm, from end to end, was rapidly adhered on the copolymer coated surface of the test plastic film by repeatedly contacting the tape therewith. The adhered tape was thereafter rapidly peeled off at an angle of 90°. Based upon an observation of the manner in which the resin on the coated surface was peeled, the following ratings were determined:

| | |
|---|---|
| No peeling | Excellent |
| Peeled area on the adhered part | |
| less than 10% | Good |
| 10-20% | Fairly good |
| over 20% | Bad |

(b) Heat-sealing Strength

Each of the coated surfaces of the test film was placed together and sealed under the following conditions: Heater temperature: 120 ®C., Sealing pressure: 0.5 Kg/cm² and Sealing time: 0.5 sec. by the use of a bar type heatsealer. The sealing strength of the test film, 15 mm×100 mm, was measured by the use of a tensile tester (TENSILON provided by Toyo Sokki Co. Ltd. in Japan) at a 100 mm/min. pulling rate.

(c) Blocking Test

Several test films, 50 mm×50 mm, were inserted between two glass plates, permitted to stand for 48 hours at 40° C. under a pressure of 0.5 Kg/cm² and then cooled to room temperature. The degree of blocking was classified as follows:

| | |
|---|---|
| Films easy to separate, one from another, without force | Excellent |
| Films separable with a small force | Good |
| Films separable with partial peeling of the coated part, with a small force | Fairly good |
| Films not separable from one another | Bad |

The monomers used in the examples are described by the following abbreviations:
MMA: methyl methacrylate
EA: ethyl acrylate
MAA: methacrylic acid
ST: styrene
BA: n-butyl acrylate
HEMA: 2-hydroxyethyl methacrylate
AA: acrylic acid
HPMA: 2-hydroxypropyl methacrylate

EXAMPLES 1–6 and CONTROLS A and B 17.1 g of sodium lauryl sulfate (emulsifier) and 530 cc of water containing 1.4 g of potassium persulfate (catalyst) were poured into a polymerization vessel equipped with a stirrer, cooler and thermometer. The mixture was heated to about 80° C. with stirring. A further mixture of 285 g of monomers as shown in Table I and a definite amount of a mercaptan (molecular weight modifier) was slowly added to the initial mixture over a 3 hour period, and the resulting reaction mixture was thereafter maintained for 30 minutes at 80° C.

The resulting aqueous dispersion was neutralized with ammonia, maintained for 1 hour at 60° C. and cooled. It was diluted with water to bring the concentration of copolymer to 20%. The thus obtained dispersion was applied to the corona-discharged surface of a biaxially oriented polypropylene film in a 20μ thickness, and at a 1.0 g/m² solids concentration, and was thereafter dried for 1 minute at 110° C. to yield the coated film.

In Table I, the effect on adhesion to the base film and heat-sealing strength is indicated for varying quantities of monomers and molecular weight modifier, for each of Examples 1–6 and Controls A and B.

TABLE I

| | Monomers Used (W/W%) | | | Molecular Weight Modifier (Parts per 100 parts of total monomers) | Average Molecular Weight | Cellophane Tape Test | Heat Sealing Strength (g/15 mm) | |
|---|---|---|---|---|---|---|---|---|
| | MMA | EA | MAA | | | | 100° C. | 120° C. |
| Control A | 55.0 | 36.6 | 8.4 | 0 | >150,000 | bad | <30 | <30 |
| Example 1 | " | " | " | 0.6 | 33,000 | excellent | 60 | 108 |
| Example 2 | " | " | " | 1.0 | 24,000 | excellent | 118 | 132 |
| Example 3 | " | " | " | 1.4 | 16,000 | excellent | 100 | 150 |
| | ST | BA | HEMA | AA | | | | |
| Control B | 52.9 | 31.6 | 15.0 | 1.5 | 0 | >150,000 | bad | <30 | 30 |
| Example 4 | " | " | " | " | 0.7 | 25,000 | excellent | 108 | 138 |
| Example 5 | " | " | " | " | 1.0 | 22,000 | excellent | 120 | 138 |
| Example 6 | " | " | " | " | 1.5 | 13,000 | excellent | 96 | 102 |

The particle sizes of copolymers formed are as follows:
Examples 1–3 were 0.01–0.1 μ and
Examples 4–6 were 0.1–0.2 μ.

EXAMPLES 7–10 and CONTROL C

The polymerization was conducted in the same way as in Examples 1–6, but 1.0 part of mercaptan (molecular weight modifier) was added to 100 parts of total monomers. After neutralization and dilution, to 100 parts of the resulting dispersion were added 4 parts of an aqueous carnauba wax dispersion (20% solid) and 0.3 part of a fine silica powder.

The resulting dispersion was applied to the corona-discharged surface of a biaxially oriented polypropylene film in 20μ thickness at a solids concentration of 1.0 g/m² and was thereafter dried for one minute at 110°C. to yield the coated film.

The test results are shown in Table II. The influences of second-order transition temperature of the copolymers upon adhesion and heat-sealing strength of the base film are indicated in the table.

3 g/m², and thereafter dried for one minute at 110° C. to yield the product film.

The adhesion between the biaxially oriented polypropylene film and the vinylidene chloride-methyl acrylate copolymer coating layer was excellent and the heat-sealing strength was 150 g/15 mm.

TABLE III

|  | Monomers Used (W/W %) | | | | Cellophane Tape Test | Heat Sealing Strength (g/15 mm) | Blocking Test |
| --- | --- | --- | --- | --- | --- | --- | --- |
|  | MMA | EA | HPMA | MAA |  |  |  |
| Control D | 42.5 | 42.5 | 15.0 | 0 | fairly good | 60 | excellent |
| Example 11 | 42.0 | 42.0 | 15.0 | 1.0 | good | 75 | excellent |
| Example 12 | 40.0 | 40.0 | 15.0 | 5.0 | excellent | 125 | excellent |
| Example 13 | 38.7 | 38.7 | 15.0 | 7.6 | excellent | 123 | good |
| Example 14 | 38.3 | 38.3 | 15.0 | 8.4 | excellent | 120 | good |
| Example 15 | 45.8 | 45.8 | 0 | 8.4 | excellent | 125 | good |
|  | ST | EA | HEMA | AA | MAA |  |  |
| Control E | 53.1 | 31.9 | 15.0 | 0 | — | fairly good | 65 | excellent |
| Example 16 | 52.9 | 31.6 | 15.0 | 0.5 | — | excellent | 100 | excellent |
| Example 17 | 52.5 | 31.5 | 15.0 | 1.0 | — | excellent | 93 | excellent |
| Example 18 | 51.9 | 31.1 | 15.0 | 2.0 | — | excellent | 105 | excellent |
| Example 19 | 51.3 | 30.7 | 15.0 | 3.0 | — | excellent | 98 | good |
| Example 20 | 48.13 | 28.87 | 15.0 | — | 8.0 | excellent | 108 | good |

TABLE II

|  | Monomers Used (W/W%) | | | | Second-order Transition Temp. (°C.) | Cellophane Tape Test | Heat Sealing Strength | | Blocking Test |
| --- | --- | --- | --- | --- | --- | --- | --- | --- | --- |
|  | MMA | EA | HPMA | MAA |  |  | 100° C. | 120° C. |  |
| Control C | 25.5 | 59.5 | 15.0 | 5.0 | 10 | excellent | 30 | 52 | bad |
| Example 7 | 34.0 | 51.0 | 15.0 | 5.0 | 20 | excellent | 36 | 55 | fairly good |
| Example 8 | 42.5 | 42.5 | 15.0 | 5.0 | 33 | excellent | 90 | 105 | good |
| Example 9 | 51.0 | 34.0 | 15.0 | 5.0 | 44 | excellent | 95 | 110 | excellent |
| Example 10 | 59.5 | 25.5 | 15.0 | 5.0 | 55 | excellent | 85 | 95 | excellent |

EXAMPLES 11-20 and CONTROLS D and E

The coatng compositions and coated films produced therewith were prepared in the same way as in Examples 7-10. The monomers used and the test results are shown in Table III. The influence of the use of varying monomer proportions, particularly of the α,β-unsaturated carboxylic acid, is indicated in Table III.

EXAMPLE 21

The coating composition of Example 17 was applied to a biaxially oriented polyethyleneterephthalate film in 12 microns thickness to the extent of 1.0 g/m², and the coated material was thereafter dried for one minute at 110° C. The adhesion of the composition to the base film was excellent and the heat seal strength was 120 g/15 mm.

EXAMPLE 22

To a 50% aqueous vinylidene chloride-methyl acrylate dispersion were added 0.2 part of a fine silica powder (to 100 parts of the copolymer) and 3 parts of an aqueous carnauba wax dispersion (20% solid) (to 100 parts of the copolymer). The resulting mixture was applied to the coated film of Example 5 to the extent of

EXAMPLE 23

In the same way as in Example 22, the vinylidene chloride-methylacrylate copolymer was coated on the coated surface of the film of Example 12. The adhesion between the biaxially oriented polypropylene film and the copolymer coating layer was excellent and the heat-sealing strength was 135 g/15 mm.

EXAMPLE 24

In the same way as in Example 12, both surfaces of a biaxially oriented polypropylene film were coated. Its one surface (A) was coated by an acrylate copolymer and the opposite surface (B) was coated by a vinylidene chloride-methyl acrylate copolymer in the same way as in Example 22.

The heat-sealing strengths of surface (A) to itself, surface (A) to surface (B), and surface (B) to itself were 145 g/15 mm, 115 g/15 mm and 120 g/15 mm, respectively.

EXAMPLES 25-30 and CONTROLS F and G 17.1 g of sodium lauryl sulfate and 530 cc of water containing 1.4 g of potassium persulfate were poured into a polymerization vessel equipped with stirrer, cooler and thermometer. The initial mixture was heated to about 80° C. with stirring. A mixture of 285 g of monomers (as shown in Table IV) and a definite amount of a mercaptan as a molecular weight modifier was slowly added to the initial mixture over a 3 hour period and thereafter maintained for 30 minutes at 80° C.

The resulting aqueous dispersion was neutralized with ammonia, maintained for 1 hour at 60° C. and cooled. It was thereafter diluted with water to bring the concentration of copolymer to 20%. The resulting composition was applied to the corona-discharged surface of a biaxially oriented polypropylene film (20 microns) having a contact angle of 60° to water, by using a Mayer Bar and then dried for 1 minute in a 110° C. oven. The solids concentration of the coating after drying was 0.5–0.6 g/m².

On the above sub-coated surface of the film was further coated a coating composition of 100 parts of an aqueous vinylidene chloride-acrylate copolymer dispersion (vinylidenechloride: 85% by weight), 2.0 parts of a wax (mp. 65° C.) dispersion, and 0.1 part of calcium carbonate.

TABLE IV

| | Monomers Used (W/W %) | | | Average Molecular Weight | Cellophane Tape Test | Heat Sealing Strength (g/15 mm) |
|---|---|---|---|---|---|---|
| | MMA | EA | MAA | | | |
| Control F | 55.0 | 36.6 | 8.4 | 150,000 | bad | 65 |
| Example 25 | " | " | " | 33,000 | excellent | 148 |
| Example 26 | " | " | " | 24,000 | excellent | 178 |
| Example 27 | " | " | " | 16,000 | excellent | 158 |
| | ST | BA | HEMA | AA | | |
| Control G | 52.9 | 31.6 | 15.0 | 1.5 | 150,000 | bad | 58 |
| Example 28 | " | " | " | " | 25,000 | excellent | 130 |
| Example 29 | " | " | " | " | 22,000 | excellent | 145 |
| Example 30 | " | " | " | " | 13,000 | excellent | 160 |

EXAMPLES 31–39 and CONTROL H

The coating compositions and coated films produced therewith were prepared in the same way as in Examples 4–7. The monomers used and the test results are shown in Table V. The influence of the use of varying monomer proportions, particularly of the α,β-unsaturated carboxylic acid, is indicated in Table V.

TABLE V

| | Monomers Used (% by weight) | | | | | | Cellophane Tape Test | Heat Sealing Strength (g 15 mm) | |
|---|---|---|---|---|---|---|---|---|---|
| | | | | | | | | 100° C. | 120° C. |
| | ST | BA | HEMA | AA | | | | | |
| Control H | 53.1 | 31.9 | 15.0 | 0 | | | bad | — | — |
| Example 31 | " | " | " | 0.1 | | | good | 33 | 83 |
| Example 32 | " | " | " | 0.1 | | | good | 73 | 90 |
| Example 33 | " | " | " | 0.5 | | | excellent | 100 | 120 |
| Example 34 | " | " | " | 1.0 | | | excellent | 133 | 140 |
| Example 35 | " | " | " | 2.0 | | | excellent | 125 | 133 |
| | ST | MMA | EA | BA | HEMA | AA | | | |
| Example 36 | 30.4 | 30.4 | — | 22.2 | 15 | 2 | excellent | 120 | 133 |
| Example 37 | 26 | 25.9 | 31.1 | — | 15 | 2 | excellent | 118 | 124 |
| | ST | BA | GMA | AA | | | | | |
| Example 38 | 55 | 33 | 10 | 2 | | | excellent | 50 | 120 |
| Example 39 | 53.1 | 31.9 | 15 | 2 | | | excellent | 75 | 80 |

EXAMPLES 40–45 and CONTROLS I and J

The coating compositions and coated films produced therewith were prepared in the same way as in Examples 25–30. The monomers used and the test results are shown in Table VI. The coated amount after drying was 0.5–0.6 g/m₂.

On the above sub-coated surface of the film was further coated a coating composition of 100 parts of an aqueous vinylidene chloride-acrylate copolymer dispersion (vinylidene chloride: 85% by weight), 2.0 parts of a wax (mp 65° C.) dispersion, and 0.1 part of calcium carbonate, by using a Mayer Bar and then dried for 1 minute in a 115° C. oven. The coating build-up including the undercoat and topcoat was 5.5–6.0 g/m₂.

TABLE VI

| | Undercoat | | | | | |
|---|---|---|---|---|---|---|
| | Monomers Used (% by weight) | | | Average Molecular Weight | Cellophane Tape Test | Heat Sealing Strength (g/15 mm) |
| | MMA | EA | MAA | | | |
| Control I | 55.0 | 36.6 | 8.4 | >150,000 | bad | 65 |
| Example 40 | " | " | " | 33,000 | excellent | 148 |
| Example 41 | " | " | " | 24,000 | excellent | 178 |
| Example 42 | " | " | " | 16,000 | excellent | 158 |
| | ST | BA | HEMA | AA | | |
| Control J | 52.9 | 31.6 | 15.0 | 1.5 | >150,000 | bad | 58 |
| Example 43 | " | " | " | " | 25,000 | excellent | 130 |
| Example 44 | " | " | " | " | 22,000 | excellent | 145 |
| Example 45 | " | " | " | " | 13,000 | excellent | 160 |

EXAMPLES 46-52

The coating compositions and coated films produced therewith were prepared in the same way as in Examples 1-6. The monomers used and the test results are shown in Table VII. The influence of the use of varying monomer proportions, particularly of the 2-hydroxyethyl methacrylate, is indicated in Table VII.

TABLE VII

|  | Monomers Used (% by weight) | | | | Cellophane Tape Test | Heat Sealing Strength (g 15 mm) | |
| --- | --- | --- | --- | --- | --- | --- | --- |
|  |  |  |  |  |  | 100° C. | 120° C. |
|  | ST | BA | HEMA | AA |  |  |  |
| Example 46 | 57.3 | 34.2 | 7.5 | 1.0 | excellent | 109 | 118 |
| Example 47 | 55.7 | 33.3 | 10.0 | 1.0 | excellent | 118 | 122 |
| Example 48 | 49.5 | 29.5 | 20.0 | 1.0 | excellent | 98 | 143 |
|  | MMA | ST | EA | HEMA | AA |  |  |
| Example 49 | 28.2 | 28.2 | 34.1 | 7.5 | 2.0 | excellent | 122 | 128 |
| Example 50 | 27.6 | 27.6 | 32.8 | 10.5 | 2.0 | excellent | 132 | 145 |
| Example 51 | 26.0 | 26.0 | 31.0 | 15.0 | 2.0 | excellent | 128 | 148 |
| Example 52 | 24.5 | 24.5 | 29.0 | 20.0 | 2.0 | excellent | 102 | 147 |

Variations and modifications can, of course, be made without departing from the spirit and scope of the invention.

Having thus described our invention, what we desire to secure by Letters Patent and hereby claim is:

1. A heat sealable coated plastic film comprising a polyolefin or polyester plastic film substrate coated with a composition, which comprises an aqueous dispersion containing, in substantially particulate form, a copolymer of:
   (a) at least one $\alpha,\beta$-unsaturated carboxylic acid, in an amount of from 0.1 to 10 percent by weight of the copolymer,
   (b) at least one acrylic ester selected from the group consisting of alkyl acrylates whose alkyl group contains one to twelve carbon atoms and alkyl methacrylates whose alkyl group contains one to twelve carbon atoms, and
   (c) at least one copolymerizable hydroxyalkyl ester of $\alpha,\beta$-unsaturated carboxylic acids, the amount of component (c) being from 0.1 to 80 percent by weight of the copolymer;
said ingredients being incorporated in the copolymer in proportions such that the copolymer has an average molecular weight of from 5,000 to 150,000 a second-order transition temperature of from 30° to 70° C., and comprises particles whose size is primarily from 0.01 to 1.0 micron; and said copolymer being incorporated in the aqueous dispersion in an amount of from 10 to 60 percent by weight thereof.

2. The film of claim 1, wherein said hydroxyalkyl ester of an $\alpha,\beta$-unsaturated carboxylic acid is incorporated in an amount of from about 0.1 to about 30 percent by weight of the copolymer.

3. The film of any one of claims 1 or 2, wherein the hydroxyalkyl ester of an $\alpha,\beta$-unsaturated carboxylic acid is 2-hydroxyethyl methacrylate.

4. The film of any one of claims 1 or 2 further comprising in component (c) at least one copolymerizable vinyl monomer selected from the group consisting of epoxy-substituted esters of $\alpha,\beta$-unsaturated carboxylic acids, vinyl-substituted aromatic hydrocarbons, $\alpha,\beta$-unsaturated carbonamides, vinyl esters of aliphatic acids, and vinyl chloride.

5. The film of claim 1, wherein the plastic substrate is a polyethylene, polypropylene, polybutene or polyester film.

6. The film of claim 1, wherein the plastic substrate is a biaxially oriented polypropylene film.

7. The film of claim 1, wherein the copolymer has an average molecular weight of from 10,000 to 80,000.

8. The film of claim 1, wherein at least 90% of the particles of the copolymer possess a particle size of from 0.01 to 0.5 micron.

9. The film of claim 1, wherein at least a portion of the carboxyl groups of the copolymer are neutralized with a volatile base.

10. The film of claim 1, in which a further coating formed from an aqueous dispersion of a vinylidene chloride copolymer is formed thereon.

* * * * *

UNITED STATES PATENT AND TRADEMARK OFFICE
CERTIFICATE OF CORRECTION

PATENT NO. : 4,291,090
DATED : September 22, 1981
INVENTOR(S) : Fujisawa Kenji, et al.

It is certified that error appears in the above—identified patent and that said Letters Patent is hereby corrected as shown below:

Column 5, line 41: "120(R)C." should read --120°C.--

Signed and Sealed this

Ninth Day of August 1983

[SEAL]

Attest:

GERALD J. MOSSINGHOFF

Attesting Officer    Commissioner of Patents and Trademarks